(12) United States Patent
Clay

(10) Patent No.: US 10,801,513 B2
(45) Date of Patent: Oct. 13, 2020

(54) COMPRESSOR HAVING A SEALING CHANNEL

(71) Applicant: Robert Bosch GmbH, Stuttgart (DE)

(72) Inventor: Alister Clay, Lohra (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 15/529,729

(22) PCT Filed: Sep. 28, 2015

(86) PCT No.: PCT/EP2015/072263
§ 371 (c)(1),
(2) Date: May 25, 2017

(87) PCT Pub. No.: WO2016/082980
PCT Pub. Date: Jun. 2, 2016

(65) Prior Publication Data
US 2017/0328373 A1     Nov. 16, 2017

(30) Foreign Application Priority Data

Nov. 27, 2014   (DE) .................. 10 2014 224 285

(51) Int. Cl.
*F04D 29/08*   (2006.01)
*F04D 29/10*   (2006.01)
(Continued)

(52) U.S. Cl.
CPC .............. *F04D 29/083* (2013.01); *F04D 1/06* (2013.01); *F04D 17/105* (2013.01);
(Continued)

(58) Field of Classification Search
CPC ...... F04D 29/083; F04D 29/44; F04D 29/102; F04D 29/162; F04D 29/2266;
(Continued)

(56) References Cited

U.S. PATENT DOCUMENTS 2,916,198 A * 12/1959 Weisel ................. F01D 17/143
                                                                      415/221
3,976,342 A *  8/1976 Leyendecker ......... F16C 17/24
                                                                      384/293
(Continued)

FOREIGN PATENT DOCUMENTS

CN        1128061 A      7/1996
CN       104019051 A     9/2014
(Continued)

OTHER PUBLICATIONS

International Search Report for PCT/EP2015/072263, dated Nov. 26, 2015.

*Primary Examiner* — Brian P Wolcott
(74) *Attorney, Agent, or Firm* — Norton Rose Fulbright US LLP; Gerard Messina

(57) ABSTRACT

A compressor having a housing and a rotor, the rotor having an impeller at least on one side; a compressor chamber being formed between the impeller and the housing, the rotor being rotationally mounted, an annular sealing channel being formed between the rotor and the housing, the sealing channel being routed from the compressor chamber to a zone having a lower pressure; a throttling section being provided in the sealing channel; the sealing section being configured in closer proximity to the low-pressure zone than to the compression chamber.

9 Claims, 5 Drawing Sheets

(51) Int. Cl.
*F04D 29/42* (2006.01)
*F16J 15/447* (2006.01)
*F04D 17/12* (2006.01)
*F04D 29/16* (2006.01)
*F04D 17/10* (2006.01)
*F04D 1/06* (2006.01)
*F04D 29/26* (2006.01)
*F04D 29/44* (2006.01)
*F04D 29/058* (2006.01)

(52) U.S. Cl.
CPC ......... *F04D 17/122* (2013.01); *F04D 29/102* (2013.01); *F04D 29/162* (2013.01); *F04D 29/266* (2013.01); *F04D 29/4206* (2013.01); *F04D 29/44* (2013.01); *F16J 15/447* (2013.01); *F04D 29/058* (2013.01)

(58) Field of Classification Search
CPC .. F04D 29/266; F04D 29/284; F04D 29/4206; F04D 1/06; F04D 17/105; F04D 17/122; F04D 27/002; F04D 27/003; F04D 27/009; F01D 11/00; F01D 11/02; F02C 6/12; F02C 7/143; F16J 15/447
See application file for complete search history.

(56) References Cited

U.S. PATENT DOCUMENTS

| | | | |
|---|---|---|---|
| 4,260,339 A * | 4/1981 | Lofts | F02C 6/12 417/406 |
| 4,482,303 A * | 11/1984 | Acosta | F01D 25/16 384/121 |
| 4,756,673 A * | 7/1988 | Miyashita | F01D 25/14 417/400 |
| 4,941,801 A * | 7/1990 | Takakura | F04D 13/14 415/170.1 |
| 6,062,028 A * | 5/2000 | Arnold | F02C 6/12 417/407 |
| 7,407,364 B2 * | 8/2008 | Arnold | F01D 9/026 415/100 |
| 7,568,883 B2 * | 8/2009 | Arnold | F04D 17/122 415/100 |
| 9,856,886 B2 * | 1/2018 | Kares | F04D 17/122 |
| 2006/0198743 A1 | 9/2006 | Taga | |
| 2007/0280823 A1 | 12/2007 | Kanemori | |
| 2011/0182719 A1 | 7/2011 | Deo et al. | |
| 2014/0219790 A1 | 8/2014 | Houst et al. | |
| 2015/0219106 A1 * | 8/2015 | Klink | F04D 17/12 415/83 |

FOREIGN PATENT DOCUMENTS

| | | |
|---|---|---|
| DE | 19921765 A1 | 11/2000 |
| DE | 102013201771 A1 | 8/2014 |
| DE | 112013005565 T5 | 8/2015 |
| JP | 2003314496 A | 11/2003 |
| JP | 2012177311 A | 9/2012 |
| JP | 2012251528 A | 12/2012 |
| WO | 2000/001935 A1 | 1/2000 |
| WO | 2016082980 A1 | 6/2016 |

* cited by examiner

US 10,801,513 B2

COMPRESSOR HAVING A SEALING CHANNEL

FIELD OF THE INVENTION

The present invention relates to a compressor.

BACKGROUND INFORMATION

In the related art, a turbocompressor is discussed in the German Patent Application DE 10 2012 012 540 A1 that has a first compressor stage having a first impeller and a second compressor stage having a second impeller. The first and second impeller are configured on a common shaft, and the shaft is mounted contactlessly. A sealing gap is formed between the first and second compressor stage. To seal the sealing gap, a groove is provided in the housing. In addition, the impeller has a flange that mates with the groove.

SUMMARY OF THE INVENTION

It is an object of the present invention to provide a compressor that will feature an enhanced sealing of the sealing channel.

The object of the present invention is achieved by the compressor in accordance with the features described herein. Advantageous specific embodiments of the present invention are described in the further descriptions herein.

The compressor has the advantage of enhancing the configuration of the sealing channel between a compressor chamber and a low-pressure zone. In particular, an axial force acting on the rotor is reduced. In addition, any leakage occurring through the sealing channel is reduced. Moreover, the rotor's resistance to rotation is relatively low. These advantages are achieved in that the sealing channel has a throttling section, the sealing section being configured in closer proximity to the low-pressure zone than to the compression chamber.

In one specific embodiment, the throttling section is configured in a first third of a second half of the sealing channel adjacent to the center plane of the sealing channel. Tests have shown that good results are obtained when the throttling section in this portion is configured relative to a center plane of the sealing channel.

In another specific embodiment, the sealing edge, which is formed by the housing or the rotor, for example, or a sealing element of the housing or of the rotor, is asymmetrically configured relative to the center plane of the sealing channel. The configuration, respectively the shifting of the throttling section toward the low-pressure zone is thereby achieved using a non-complex arrangement.

In another specific embodiment, the groove is asymmetrically formed relative to a center plane of the sealing channel in a way that allows the throttling section to be configured in closer proximity to the low-pressure zone.

In another specific embodiment, the annular groove is bounded in the plane of the axis of rotation on opposite sides by two shoulders. A first shoulder, which is configured on a higher-pressure side, is formed to be higher perpendicularly to the axis of rotation than is the second shoulder. This also improves the pressure drop across the sealing channel.

The present invention will be explained in greater detail with reference to the figures.

DETAILED DESCRIPTION

Figure 1:
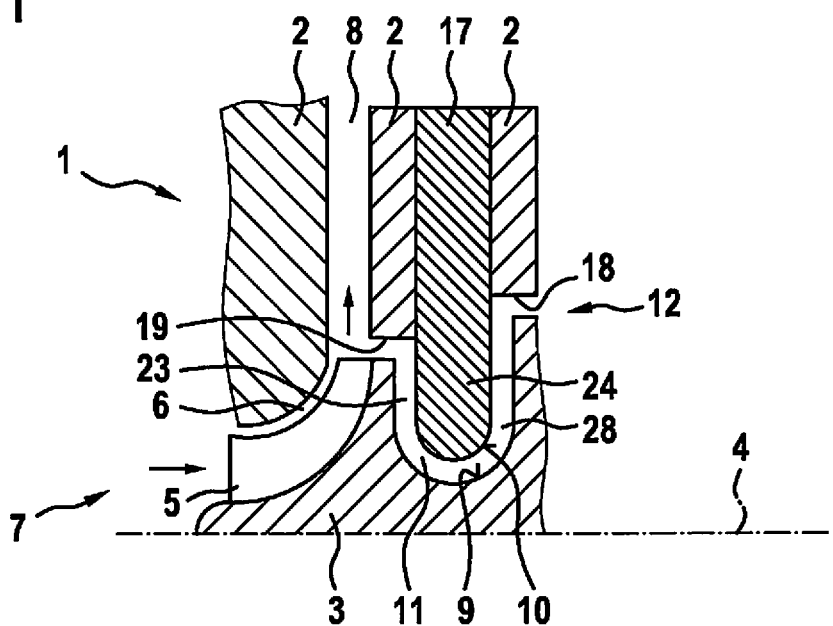
FIG. 1 shows a first specific embodiment of a compressor having a rotor including an impeller.

FIG. 1 shows a schematic cross section through a part of a compressor 1 that has a housing 2 and a rotor 3. Rotor 3 and housing 2 are formed rotationally symmetrically to an axis of rotation 4. On a first side, rotor 3 has a first impeller 5 including rotor blades. A first compressor chamber 6 is formed between first impeller 5 and housing 2. In the illustrated exemplary embodiment, first compressor chamber 6 has an annular first intake duct 7. If rotor 3 rotates about axis of rotation 4, a medium is drawn in via first intake duct 7, is compressed by first impeller 5, and is output via a first compression channel 8. A sealing channel 11, which connects first compressor chamber 6 with a zone having a lower pressure 12, is formed between a radial exterior 9 of rotor 3 and an associated interior 10 of housing 2. Rotor 3 may be rotationally mounted in the region of sealing channel 11 via a contactless mount in housing 2. As a function of the selected specific embodiment, rotor 3 may also be connected to a shaft (not shown) that is mounted in axis of rotation 4 and is rotationally mounted on housing 2. In the illustrated specific embodiment, housing 2 features a sealing element 17 that forms a section of interior 10 of housing 2. Sealing element 17 has the shape of an annular web 24 that engages into an annular groove 28 of rotor 3. Web 24 is laterally bounded by two annular shoulders 18, 19. First shoulder 18 is adjacent to a low-pressure zone 12. Second shoulder 19 is adjacent to a high-pressure zone 6. First shoulder 18 is more radially distant from the axis of rotation than is second shoulder 19.

As a function of the selected design, rotor 3 may also have an annular web on exterior 9 thereof that engages into an annular groove of housing 2. In addition, the web may be formed by a material of housing 2, respectively of rotor 3 and, in particular, in one piece with housing 2, respectively rotor 3.

Figure 2:
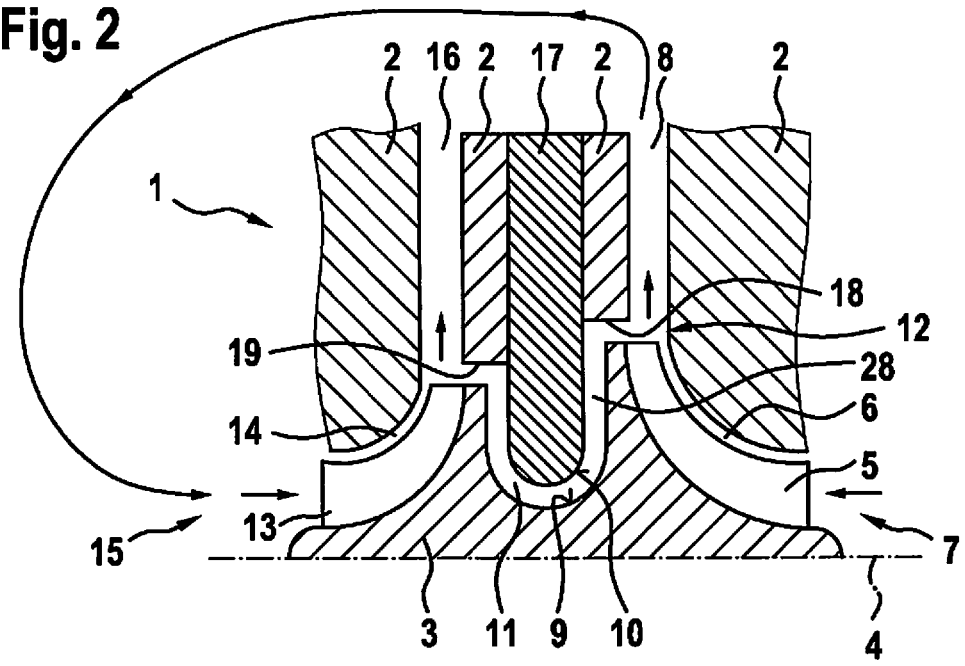
FIG. 2 shows a second specific embodiment of a compressor having a rotor including two impellers.

FIG. 2 shows a specific embodiment of a compressor 1 that is fabricated in accordance with the compressor of FIG. 1, however, rotor 3 having a second impeller 13 having second rotor blades on a second side. In addition, a second compressor chamber 14 is formed between second impeller 13 and housing 2. Furthermore, second compressor chamber 14 has a second annular intake duct 15. In addition, a second compression channel 16 is provided in housing 2. Second impeller 13 is formed to be rotationally symmetric to axis of rotation 4. Second compressor chamber 14 is connected via sealing channel 11 to first compressor chamber 6. In addition, second intake duct 15 may be connected to first compressor channel 8 via a line that is schematically indicated by an arrow. In this manner, two compressor stages may be realized with the aid of a rotor 3 in a compressor 1. First impeller 5 pre-compresses the medium, a second, higher compression of the pre-compressed medium, that is subsequently output via second compression channel 16, being achieved by second impeller 13. In the illustrated specific embodiment, housing 2 features a sealing element 17 that forms a section of interior 10 of housing 2. Sealing element 17 has the shape of an annular web 24 that engages into an annular groove 28 of rotor 3. As a function of the selected design, rotor 3 may also have an annular web on exterior 9 thereof that engages into an annular groove of housing 2. The web may also be formed by a material of housing 2, respectively of rotor 3 and, in particular, in one piece with housing 2, respectively rotor 3.

Figure 3:
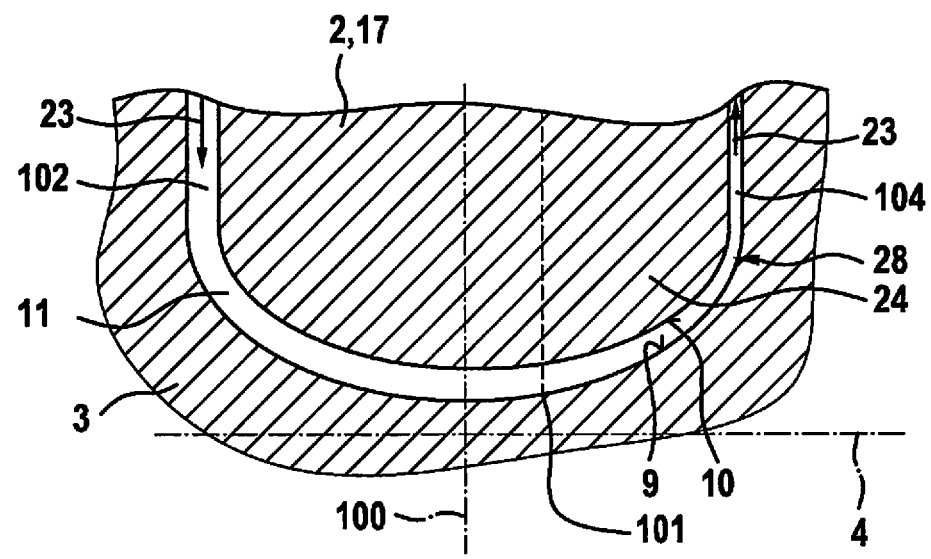
FIG. 3 shows a schematic cross section through the compressor in the plane of the axis of rotation in the region of the sealing channel.

In an enlarged sectional view, FIG. 3 shows sealing channel 11 of a compressor 1 that may be configured in accordance with the specific embodiments of FIGS. 1 and 2. A center plane 100 for the middle of groove 28 is drawn in FIG. 3. The center plane denotes the middle of sealing channel 11. In addition, a narrow section 101 is drawn by a dotted line. In a direction of flow 23 starting out from a side having a higher pressure 102 to a side having a lower pressure 104, narrow section 101 denotes the zone in which the cross-sectional area of sealing channel 11 has the smallest cross section. In comparison to center plane 100, narrow section 101 is shifted toward the side having lower pressure 104.

Figure 4:
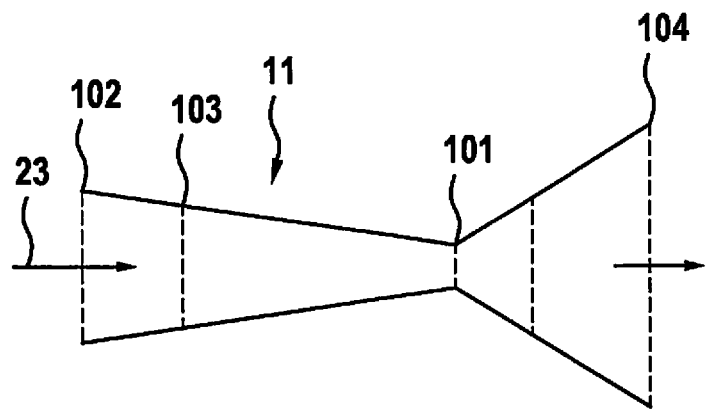
FIG. 4 shows a schematic representation of the cross-sectional area along the sealing channel.

In a schematic representation, FIG. 4 shows the variation of cross-sectional area 103 of sealing channel 11 in direction of flow 23. The size of cross-sectional area is represented by the two-dimensional width of sealing channel 11. Starting from a high-pressure side 102, cross-sectional area 103 of sealing channel 11 in flow direction 23 decreases continuously in the direction toward narrow section 101. Following narrow section 101, cross-sectional area 103 of sealing channel 11 continuously increases in the direction toward a low-pressure side 104. High-pressure side 102 corresponds to input at sealing channel 11; and low-pressure side 104 corresponds to the outlet at sealing channel 11. Shifting narrow section 101 toward low-pressure side 104 enhances the sealing action, while a low pressure and low resistance for the rotor rotation are simultaneously maintained. An optimal position for narrow section 101 depends on the dimensions of sealing channel 11, the length of sealing channel 11, and the pressure difference between high-pressure side 102 and low-pressure side 104. Thus, an optimal position for narrow section 101 is to be experimentally ascertained for each type of compressor.

Figure 5:
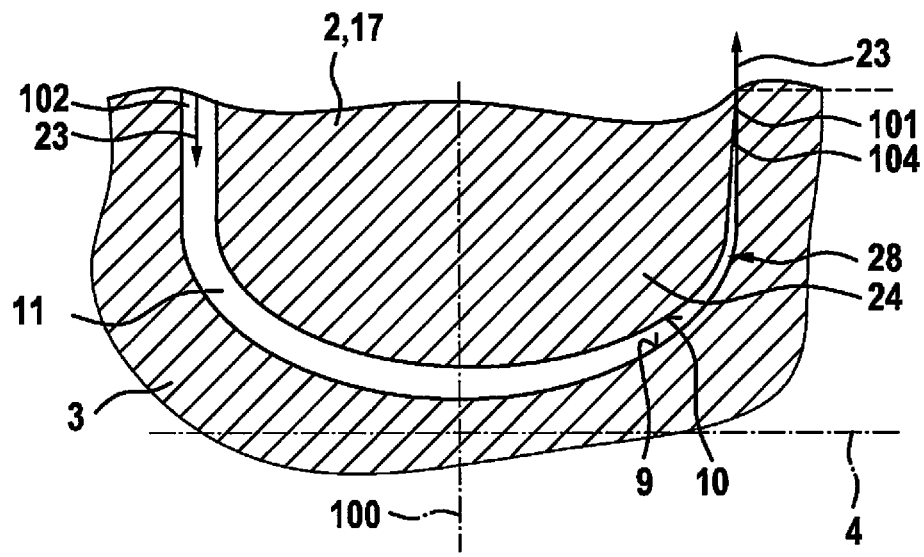
FIG. 5 shows a schematic detail of another specific embodiment of a compressor in the region of the sealing channel.

In an enlarged, schematic sectional view, FIG. 5 shows another specific embodiment of a compressor 1 having a sealing channel 11 that may be formed in accordance with the specific embodiments of FIGS. 1 and 2. In this specific embodiment, sealing channel 11 is formed in such a way that narrow section 101 is configured at the end of the sealing channel on low-pressure side 104.

Figure 6:
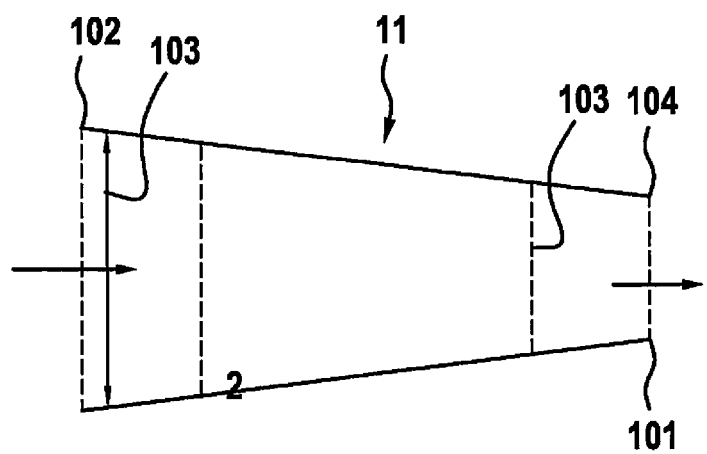
FIG. 6 shows a schematic representation of the cross-sectional area of the sealing channel of the specific embodiment of FIG. 5.

FIG. 6 shows a two-dimensional representation of cross-sectional area 103 of sealing channel 11 of FIG. 5. It is discernible that cross-sectional area 103 continuously decreases from high-pressure side 102 toward low-pressure side 104. In this specific embodiment, the pressure drop is enhanced while leakage or forces acting on the rotor are simultaneously reduced.

Narrow section 101 may be shifted from a center plane 100, 128 toward low-pressure side 104, as schematically illustrated in FIG. 3 through 6, with the aid of various specific embodiments.

Figure 7:
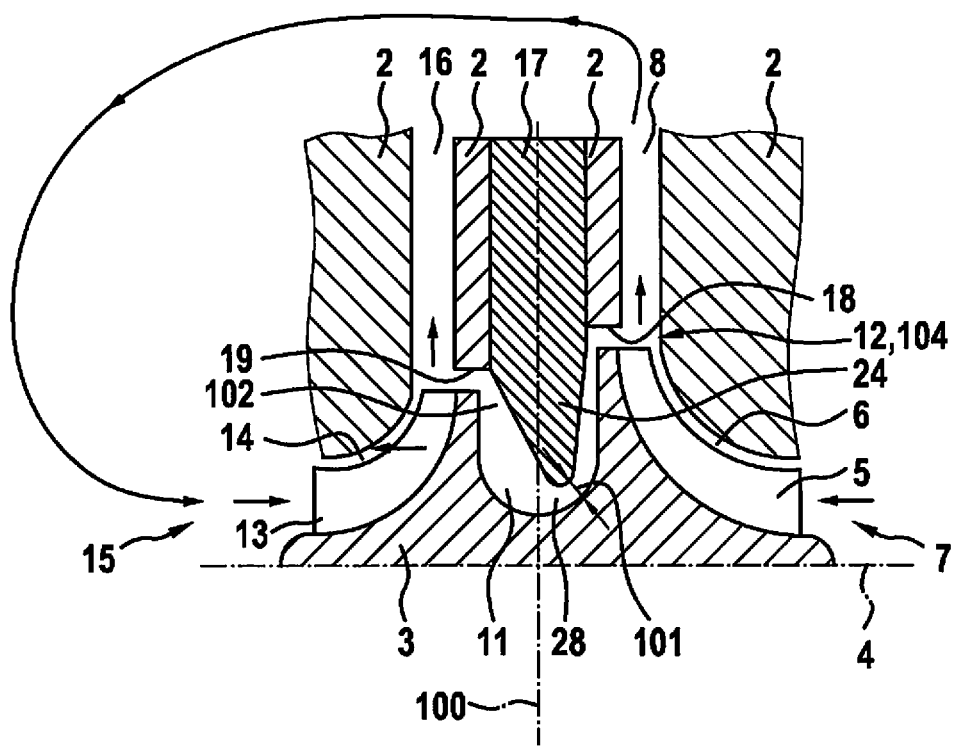
FIG. 7 shows a schematic representation of another specific embodiment of a compressor.

FIG. 7 shows a first specific embodiment of a compressor 1 that is essentially configured in accordance with FIG. 2. However, in contrast to FIG. 2, interior 10 of housing 2 has an asymmetrical shape in a cross section relative to axis of rotation 4 and to center plane 100 of groove 28. Web 24 may be realized by housing 2 and at least partially by a sealing element 17. In the illustrated specific embodiment, web 24 is realized by a sealing element 17. The asymmetrical formation of web 24 shifts narrow section 101 in accordance with FIG. 3. The narrow section may be shifted to a desired position toward low pressure side 104 as a function of the selected contour of web 24.

Figure 8:
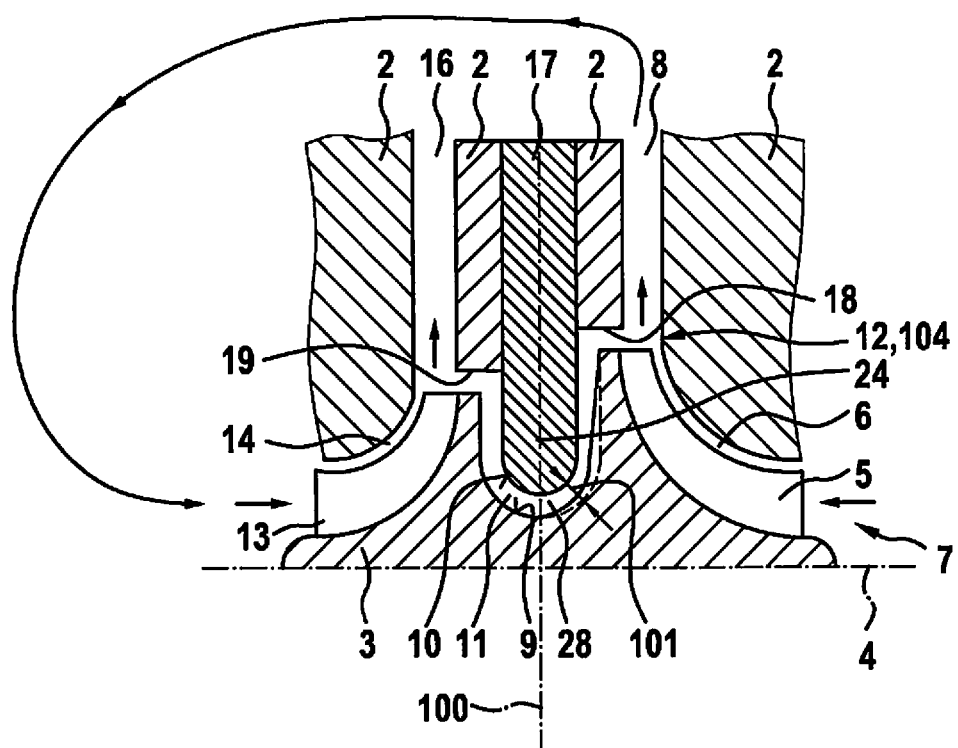
FIG. 8 shows a schematic part sectional view of another specific embodiment of a compressor.

FIG. 8 shows another specific embodiment of a compressor 1 that is essentially formed in accordance with FIG. 2. However, in contrast to FIG. 2, the narrow section is likewise shifted in accordance with FIG. 3. In this specific embodiment, web 24 features a mirror-symmetric contour on interior 10 in a cross section through the plane of axis of rotation 4 relative to center plane 100. In this specific embodiment, exterior 9 of rotor 3 is configured asymmetrically relative to center plane 100. On the section of sealing channel 11, that is configured from center plane 100 in the direction of low-pressure side 104, outer side 9 of groove 28 has a greater radial distance to axis of rotation 4 than would a mirror-symmetric side of groove 28. A mirror-symmetric specific embodiment of groove 28 is shown in the form of a dotted line. Thus, the form of the contour may also shift outer side 9 on the side of rotor 3, i.e., by a corresponding formation of groove 28, a narrow section 101 is shifted from center plane 100 toward low-pressure side 104.

Combinations of FIG. 7 and FIG. 8 may be selected as a function of the selected specific embodiment, so that neither groove 28 nor web 24 is formed mirror-symmetrically to center plane 100 in order to shift narrow section 101 from center plane 100 toward low-pressure side 104.

For the advantageous effect of shifting the narrow section, it is not absolutely necessary that the cross section of channel 11 decrease continuously starting from the high-pressure side, respectively continuously starting from the narrow section toward the low-pressure side. What is important in this context is only that the narrow section actually represent the narrowest section of the cross section.

In the illustrated specific embodiments of FIGS. 7 and 8, housing 2 features a sealing element 17 that forms a section of interior 10 of housing 2. Sealing element 17 has the shape of an annular web 24 that engages into an annular groove 28 of rotor 3. As a function of the selected design, rotor 3 may also have an annular web on exterior 9 thereof that engages into an annular groove of housing 2. In addition, the web may be formed by a material of housing 2, respectively of rotor 3 and, in particular, in one piece with housing 2, respectively rotor 3. In addition, a corresponding sealing element may be provided both on rotor 3, as well as on housing 2, the sealing elements radially bounding the sealing channel.

What is claimed is:

1. A compressor, comprising:
   a housing;
   a rotor having an impeller at least on one side;
   wherein a compressor chamber is formed between the impeller and the housing, wherein the rotor is rotationally mounted about an axis of rotation,
   wherein an annular sealing channel is formed between the rotor and the housing, and wherein the annular sealing channel is routed from the compressor chamber to a zone having a lower pressure,
   wherein a throttling section is in the sealing channel, and wherein the throttling section is configured in closer proximity to the low-pressure zone than to the compression chamber, wherein the throttling section is configured in a zone having low-pressure as compared with other zones in the sealing channel having a higher pressure and in which a cross-sectional area of the sealing channel has a smallest cross section, wherein, on a portion of the sealing channel that is configured from a center plane in a direction of the low-pressure zone, an outer side of a circumferential groove has a greater radial distance to the axis of rotation as compared with a mirror-symmetric side of the circumferential groove.

2. The compressor of claim 1, wherein the throttling section is configured adjacently to a middle of the sealing channel in a first third of a second half of the sealing channel in closer proximity to the low-pressure zone.

3. The compressor of claim 1, wherein the rotor has the circumferential groove in the sealing channel, wherein the housing has a circumferential web, wherein the circumferential web engages into the circumferential groove, and wherein at least one of the circumferential web and the circumferential groove are asymmetrically formed relative to a center plane of the circumferential groove so that the throttling section is configured in closer proximity to the low-pressure zone.

4. The compressor of claim 1, wherein the housing has the circumferential groove, and wherein the rotor has a circumferential web, wherein the circumferential web engages into the circumferential groove, wherein the sealing channel is formed between the circumferential web and the circumferential groove, and wherein at least one of the circumferential web and the circumferential groove is asymmetrically formed relative to a center plane of the circumferential groove so as to allow the throttling section to be configured in closer proximity to the low-pressure zone compared to the compression chamber.

5. The compressor of claim 1, wherein the impeller is configured on a first side of the rotor, wherein a second impeller is configured on a second side of the rotor, and wherein the impeller and the second impeller represent a first impeller stage and a second impeller stage.

6. The compressor of claim 1, wherein the rotor is rotationally mounted on a bearing contactlessly, and wherein the bearing is configured between the housing and the rotor in the region of the sealing channel.

7. The compressor of claim 1, wherein at least one portion of at least one of the housing and the rotor, which is adjacent to the sealing channel, includes a sealing element, which is formed of a softer material than the housing or the rotor.

8. The compressor of claim 1, wherein at least one of the housing and the rotor in the region of the sealing channel have an asymmetrical shape relative to the center plane of the sealing channel.

9. A compressor, comprising:
a housing;
a rotor having an impeller at least on one side;
wherein a compressor chamber is formed between the impeller and the housing, wherein the rotor is rotationally mounted about an axis of rotation,
wherein an annular sealing channel is formed between the rotor and the housing, and wherein the annular sealing channel is routed from the compressor chamber to a zone having a lower pressure,
wherein a throttling section is in the sealing channel, and
wherein the throttling section is configured in closer proximity to the low-pressure zone than to the compression chamber,
wherein the rotor has a circumferential groove in the sealing channel, wherein the housing has a circumferential web, wherein the circumferential web engages into the circumferential groove, and wherein at least one of the circumferential web and the circumferential groove are asymmetrically formed relative to a center plane of the circumferential groove so that the throttling section is configured in closer proximity to the low-pressure zone,
wherein the circumferential web is laterally bounded by two annular shoulders, a first shoulder being adjacent to the low-pressure zone, a second shoulder being adjacent to a high-pressure zone, and wherein the first shoulder is more radially distant from the axis of rotation than is the second shoulder.

* * * * *